United States Patent [19]

Miyazawa

[11] Patent Number: 4,562,357
[45] Date of Patent: Dec. 31, 1985

[54] UNINTERRUPTIBLE POWER SUPPLY AND A STARTING METHOD

[75] Inventor: Yoshiaki Miyazawa, Hino, Japan

[73] Assignee: Tokyo Shibaura Denki Kabushiki Kaisha, Kawasaki, Japan

[21] Appl. No.: 592,560

[22] Filed: Mar. 23, 1984

[30] Foreign Application Priority Data

Apr. 8, 1983 [JP] Japan ................................ 58-60995

[51] Int. Cl.[4] .............................................. H02J 9/06
[52] U.S. Cl. ........................................ 307/66; 307/87
[58] Field of Search ....................... 307/46, 48, 64, 66, 307/85-87; 323/222, 266; 363/21, 23, 89

[56] References Cited

U.S. PATENT DOCUMENTS

| | | | |
|---|---|---|---|
| 4,065,711 | 12/1977 | Kawabata | 307/66 X |
| 4,293,904 | 10/1981 | Brooks et al. | 323/266 X |
| 4,322,787 | 3/1982 | Kraus | 323/266 X |
| 4,426,587 | 1/1984 | Nouet | 307/66 |
| 4,506,766 | 3/1985 | Watanabe | 307/64 X |

FOREIGN PATENT DOCUMENTS

| | | |
|---|---|---|
| 0015462 | 9/1980 | European Pat. Off. |
| 1033895 | 6/1966 | United Kingdom . |
| 1066657 | 4/1967 | United Kingdom . |
| 1287989 | 9/1972 | United Kingdom . |
| 1393637 | 5/1975 | United Kingdom . |
| 1447906 | 9/1976 | United Kingdom . |
| 0079462 | 5/1983 | United Kingdom . |
| 2111326 | 6/1983 | United Kingdom . |

OTHER PUBLICATIONS

Siemens Review XL No. 8, "Uninterruptible Power Supplies with Inverters": Wilhelm Forstbauer: 1973.

Primary Examiner—A. D. Pellinen
Assistant Examiner—Derek Jennings
Attorney, Agent, or Firm—Oblon, Fisher, Spivak, McClelland & Maier

[57] ABSTRACT

An uninterruptible power supply including a controlled rectifier for receiving a first AC voltage and for converting the first AC power voltage into a first DC output voltage, a battery for supplying a second DC output voltage, a voltage step-up chopper connected to receive the first DC output voltage and the second DC output voltage as a DC input voltage for stepping up the DC input voltage to produce a stepped-up voltage, and an inverter connected to receive the stepped-up voltage for converting the stepped-up voltage into a second AC voltage which is the AC output of the uninterruptible power supply. Additionally, a method for starting the uninterruptible power supply is disclosed.

14 Claims, 4 Drawing Figures

4,562,357

UNINTERRUPTIBLE POWER SUPPLY AND A STARTING METHOD

BACKGROUND OF THE INVENTION

1. Field of the Invention

This invention relates to an uninterruptible power supply with a voltage step-up chopper, and a starting method thereof.

2. Description of the Prior Art

FIG. 1 is a block diagram showing one example of a conventional uninterruptible power supply. In FIG. 1, the reference numeral 100A designates an uninterruptible power supply which includes an AC input interrupter 2 connected to a commercial power source 1, a battery 3, a DC input interrupter 4, and a controlled rectifier 5 which includes thyristors and simultaneously operates as a rectifier and a charger for the battery 3. The uninterruptible power supply 100A also includes an inverter 6, an inverter transformer 7 which isolates the inverter 6 from a load (not shown) for insulation, and an AC filter 8 which improves the waveform of the secondary voltage of the inverter transformer 7 so as to be sinusoidal.

As a starting method for the uninterruptible power supply 100A shown in FIG. 1, usually both the AC input interrupter 2 and the DC input interrupter 4 are previously closed, and under this condition the controlled rectifier 5 is started up so as to gradually raise the output voltage thereof, then the inverter 6 is started up so as to gradually raise the output voltage of the uninterruptible power supply 100A by the pulse width control of the inverter 6.

In case that an increase in capacity of the uninterruptible power supply 100A is required, the capacity of semiconductor elements that constitute the inverter 6 would be insufficient. This then necessitates that the inverter 6 includes a plurality of semiconductor elements in parallel connection or that the inverter 6 is constituted by a so-called multiple inverter including a plurality of inverters and inverter transformers. Moreover, the function of the controlled rectifier 5 to control the output voltage thereof is utilized only for charging the battery 3 and not for the control of the output voltage of the uninterruptible power supply 100A. Thus, the output voltage of the uninterruptible power supply 100A is controlled by an inverter control circuit (not shown) by varying the output pulse width of the inverter 6. This requires that the inverter 6 functions to perform both DC to AC conversion and output voltage control, so that the control thereof becomes complicated. Further, the amount of higher harmonic components contained in the output voltage of the inverter 6 varies corresponding to the variation of the waveform thereof caused by the variation of the output pulse width of the inverter 6, so that the design of the AC filter 8 would be very difficult and the AC filter 8 larger in size would be necessitated.

As described above, a conventional uninterruptible power supply such as shown in FIG. 1 has been disadvantageous in that when an uninterruptible power supply is larger in capacity, an inverter, an inverter transformer and an AC filter are all rendered larger in size and higher in cost due to the complicated control technique.

SUMMARY OF THE INVENTION

Accordingly, one object of this invention is to provide a novel uninterruptible power supply having a small and economical construction.

Another object of this invention is to provide a novel method for starting an uninterruptible power supply in which the uninterruptible power supply can be started simply without a complicated starting technique.

These and other objects are achieved according to this invention by providing an uninterruptible power supply including a controlled rectifier for receiving a first AC voltage and for converting the first AC voltage into a first DC output voltage and a battery for supplying a second DC output voltage. The uninterruptible power supply further includes a voltage step-up chopper connected to receive the first DC output voltage and the second DC output voltage as a DC input voltage for stepping up the DC input voltage to produce a stepped-up voltage, and an inverter connected to receive the stepped-up voltage for conversion into a second AC voltage to produce the AC power output of the uninterruptible power supply.

These and other objects are also achieved according to this invention by providing a method for starting an uninterruptible power supply as described above, including the steps of starting the inverter, starting the controlled rectifier so as to raise the first DC output voltage gradually, and detecting a reference time when the first DC output voltage reaches a reference level. The method further includes the steps of starting the voltage step-up chopper so as to raise the stepped-up voltage gradually after the reference time, and connecting the battery to an input of the voltage step-up chopper after the reference time.

BRIEF DESCRIPTION OF THE DRAWINGS

A more complete appreciation of the invention and many of the attendant advantages thereof will be readily obtained as the same becomes better understood by reference to the following detailed description when considered in connection with accompanying drawings, wherein.

DESCRIPTION OF THE PREFERRED EMBODIMENTS

Figure 1:
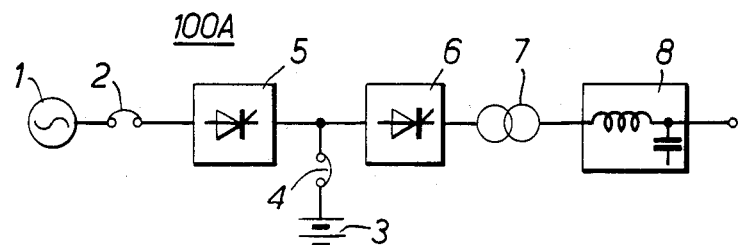
FIG. 1 is a block diagram showing one example of a conventional uninterruptible power supply.
Figure 2:
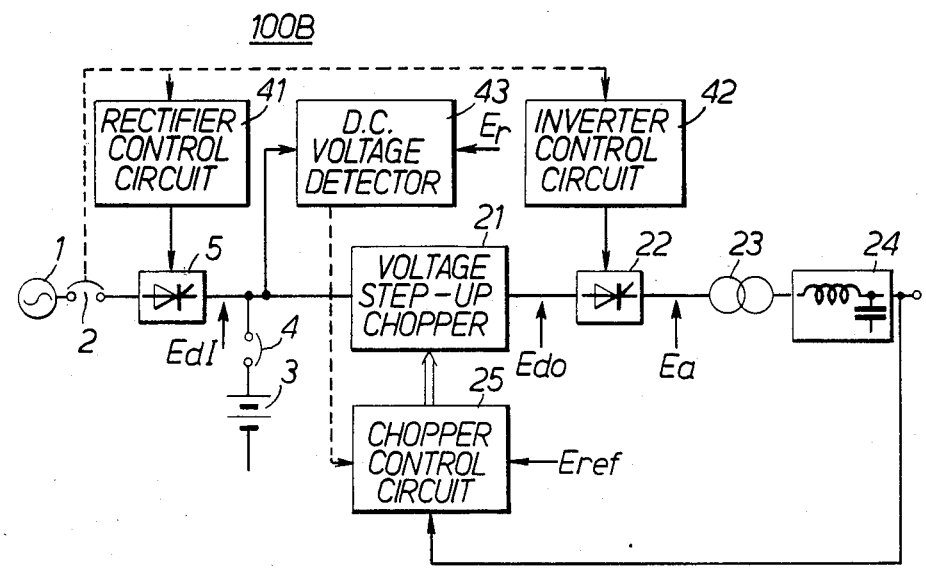
FIG. 2 is a block diagram showing an uninterruptible power supply according to a preferred embodiment of this invention.

Referring now to the drawings, wherein like reference numerals designate identical or corresponding parts throughout the several views, and more particularly to FIG. 2 thereof, an uninterruptible power supply 100B according to a preferred embodiment of this invention is shown. In FIG. 2, the reference numeral 21 designates a voltage step-up chopper which is connected to the output of the controlled rectifier 5 and is also connected to the battery 3 through the DC input interrupter 4, and steps up the received voltage. Reference numeral 22 designates an inverter of fixed pulse width type which inverts the output of the voltage step-up chopper 21 into an AC power. Reference numeral 23 designates an inverter transformer and numeral 24 designates an AC filter. Further, reference numeral 25 designates a chopper control circuit for the voltage step-up chopper 21. Chopper control circuit 25 receives the output voltage of the uninterruptible power supply 100B, compares the received output voltage with a reference value $E_{ref}$ and controls the output voltage of the voltage step-up chopper 21 so as to maintain the output voltage of the uninterruptible power supply 100B at a predetermined voltage according to the comparison result.

Reference numeral 41 designates a rectifier control circuit, and 42 designates an inverter control circuit. Both the rectifier control circuit 41 and the inverter control circuit 42 receive a start command from the AC input interrupter 2 when the AC input interrupter 2 is completely closed. The reference numeral 43 designates a DC voltage detector which detects the output voltage of the controlled rectifier 5 and generates a start command to the chopper control circuit 25 when the detected output voltage rises up to a DC reference voltage $E_r$.

Figure 4:
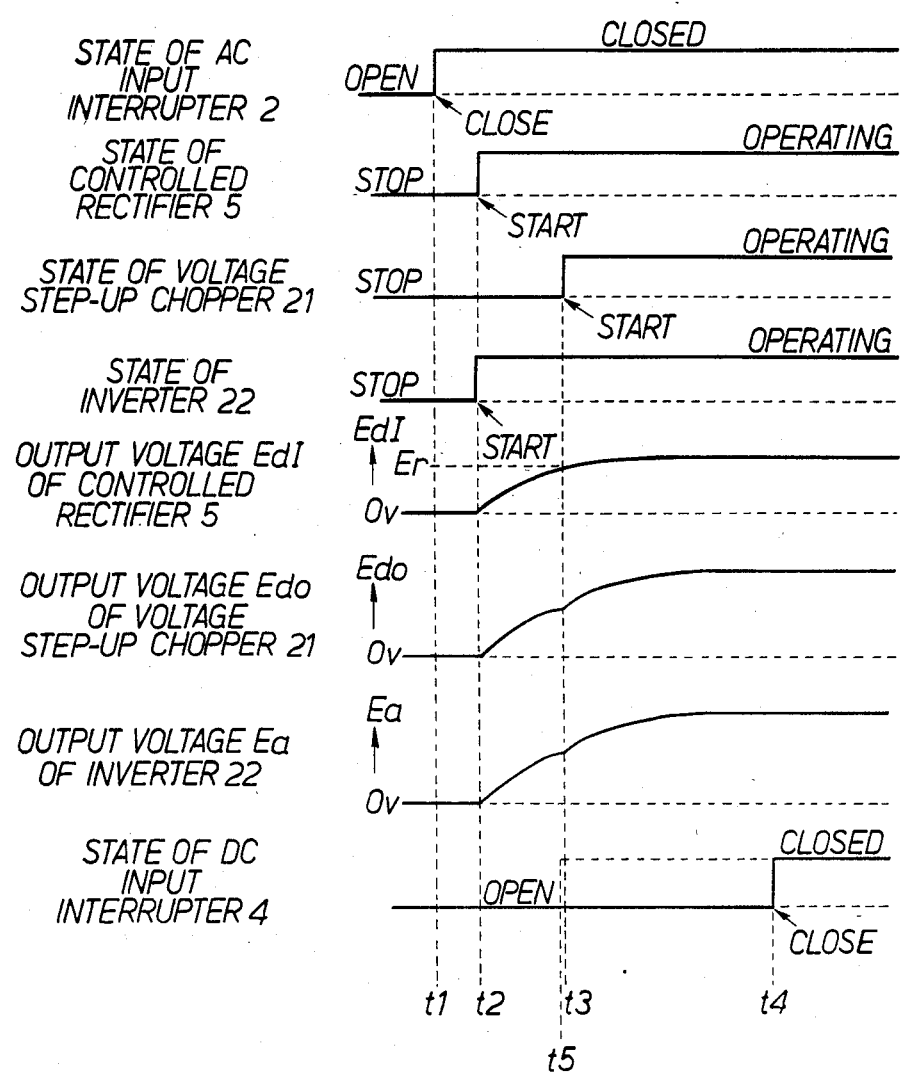
FIG. 4 is a timing chart showing one example of a method for starting the uninterruptible power supply shown in FIG. 2 according to a preferred embodiment of this invention.

Next, one example of a method for starting the uninterruptible power supply 100B will be described using the timing chart shown in FIG. 4. In FIG. 4, at a time $t_1$ the AC input interrupter 2 is initiated to close. At a time $t_2$ when the AC input interrupter 2 is completely closed, the start command is supplied to both the rectifier control circuit 41 and the inverter control circuit 42 so as to initiate operation of both the controlled rectifier 5 and the inverter 22.

The controlled rectifier 5 is inherently provided with an output voltage control function for charging the battery 3, so that it can start smoothly under the control of the rectifier control circuit 41. Thus, the output voltage $E_{dI}$ of the controlled rectifier 5 gradually rises up from zero volts as shown in FIG. 4. Because the voltage step-up chopper 21 has not initiated its operation, the output voltage $E_{dI}$ of the controlled rectifier 5 is applied without change to the inverter 22, then the output voltage $E_a$ of the inverter 22 rises up with the same slope as that of the output voltage $E_{dI}$. Though the output voltage $E_a$ is actually an AC voltage, it is shown as the envelope of the AC voltage for the sake of convenience in explanation. At a time $t_3$ when the output voltage $E_{dI}$ reaches the DC reference voltage $E_r$, the DC voltage detector 43 operates so as to supply the start command to the voltage step-up chopper control circuit 25, thus causing the voltage step-up chopper 21 to initiate its voltage step-up operation. After the time $t_3$ the control circuit 25 controls the voltage step-up chopper 21 such that the output voltage $E_{dO}$ of the voltage step-up chopper 21 rises gradually. As a result, the output voltage $E_a$ of the inverter 22 rises up with the same slope as that of the voltage $E_{dO}$, and reaches a desired voltage. Thereafter, at a time $t_4$ the DC input interrupter 4 is closed so as to connect the battery 3 directly to the output of the controlled rectifier 5 and the input of the voltage step-up chopper 21. Thus the starting operation of the uninterruptible power supply 100B is completed.

Next, the voltage step-up chopper control circuit 25 receives the output voltage of the uninterruptible power supply 100B, compares the received output voltage with the reference value $E_{ref}$ and controls the output voltage $E_{dO}$ of the voltage step-up chopper 21 so as to maintain the output voltage of the uninterruptible power supply 100B to the predetermined voltage according to the comparison result.

As described above, for the starting operation of the uninterruptible power supply 100B, the output voltage control function of the controlled rectifier 5 originally intended for the charge of the battery 3 is utilized for the starting operation of the inverter 22 such that both the input and output voltages of the inverter 22 are gradually raised, and thereafter the battery 3 is connected directly to the output of the controlled rectifier 5.

The above-described starting method permits the output voltage $E_a$ of the inverter 22 to reach a desired voltage without any abrupt rise as shown in FIG. 4, resulting in suppressing both the rush exciting current in the inverter transformer 23 and the rush current in capacitors in the AC filter 24 upon starting operation.

In the above-described embodiment, the DC input interrupter 4 is closed in the final step of the starting operation. But the present invention is not restricted to this embodiment. The DC input interrupter 4 may be closed at the instant which is after the establishment of the output voltage $E_{dI}$ of the controlled rectifier 5 and before start-up of the voltage step-up chopper 6. (For example at a time $t_5$ shown in dotted line in FIG. 4.)

Furthermore in the above-described embodiment, both the controlled rectifier 5 and the inverter 22 initiate operation simultaneously at the time $t_2$, but the following starting method may be employed. Namely, at the time $t_2$ the inverter 22 initiates operation firstly, after that the controlled rectifier 5 initiates operation and raises the output voltage $E_{dI}$ of the controlled rectifier 5 gradually from zero volts. Then the output voltage $E_a$ of the inverter 22 rises up with the same slope as that of the output voltage $E_{dI}$. This is implemented by providing the rectifier control circuit 41 with a delay circuit and when it receives the start command from the AC input interrupter 2 it makes the controlled rectifier 5 initiate operation at a time delay determined by the delay circuit after the receipt of the start command.

After start-up, the output voltage $E_a$ of the inverter 22 is controlled through the control of the output voltage $E_{dO}$ of the voltage step-up chopper 21.

A voltage step-up chopper is well known to those skilled in the art, so that detailed description of the operation thereof is omitted. Hereinafter only a brief explanation thereof will be made with reference to FIG. 3 which shows one example of a circuit construction of the voltage step-up chopper 21 shown in FIG. 2.

Figure 3:
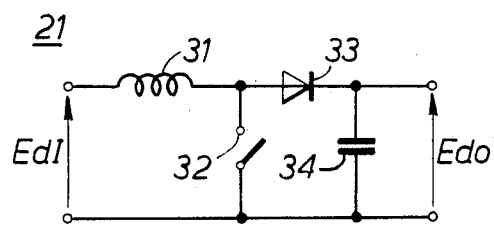
FIG. 3 is a circuit diagram showing one example of a circuit construction of the voltage step-up chopper shown in FIG. 2.

In FIG. 3, the energy of the DC input voltage $E_{dI}$ (which is the output voltage of the controlled rectifier 5) is once stored as electromagnetic energy within a reactor 31. The stored energy is then taken out through a diode 33 and a capacitor 34 to the output of the voltage step-up chopper 21. Thus the output voltage $E_{dO}$ is obtained which is higher than the input voltage $E_{dI}$. The voltage step-up performance is made by cyclically switching on and off a semiconductor switch 32 and the output voltage $E_{dO}$ of the voltage step-up chopper 21 may be varied by changing the ratio of the ON and OFF periods of the semiconductor switch 32.

In the uninterruptible power supply 100B provided with the voltage step-up chopper 21 shown in FIG. 2, the voltage step-up by the voltage step-up chopper 21 of both the output voltage of the controlled rectifier 5 and the voltage of the battery 3 can reduce the current capacity of the inverter 22 by a voltage step-up ratio of the voltage step-up chopper 21 compared with that of the inverter 6 in the conventional uninterruptible power supply 100A (for example, when a voltage step-up ratio is 2, then current capacity is reduced by ½). Thus the current capacity of the semiconductor elements that constitute the inverter 22 can be reduced. In this case the semiconductor elements will be required to have higher withstand voltage characteristics. Such reduction of current capacity is significant, particularly under the present circumstances in which semiconductor elements of high breakdown voltage have become available at low cost due to the recent progress in semiconductor technology. Thus it is more advantageous in terms of compactness, economy and reliability to construct an uninterruptible power supply utilizing a minimal number of semiconductor elements with higher breakdown voltage characteristics than to constitute an uninterruptible power supply in such a conventional manner as utilizing either plural semiconductor elements in parallel connection or a configuration of multiple inverters. Moreover, the voltage step-up chopper 21 can be constructed at relatively low cost by utilizing semiconductor elements of the self-extinction type such as transistors or gate turn-off thyristors so as to perform chopping at high frequencies (several KHz to several tens of KHz).

Furthermore, as the uninterruptible power supply 100B is constituted in such a manner that the output voltage of the voltage step-up chopper 21 is varied by the control circuit 25 so as to control the output voltage of the uninterruptible power supply 100B, the inverter 22 can be constructed with an inverter of fixed pulse width type. Moreover it is easy to construct the inverter 22 with an inverter of the pulse width modulation type that contains a particularly small amount of higher harmonics. As a result of this, the AC filter 23 can be easily designed and can be constructed small in size and low in cost. Such construction of the uninterruptible power supply 100B also has advantages that the control of the inverter 22 which had been complicated can be simplified, which is preferable in terms of its reliability or the costs of repairs upon occurrence of failure.

As described above, according to the present invention a compact, low cost uninterruptible power supply can be constructed, and can be started simply without a complicated starting technique.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An uninterruptible power supply comprising:
controlled rectifier means adapted for receiving a first AC voltage from a source and for converting said first AC voltage into a first DC output voltage;
battery means for supplying a second DC output voltage;
voltage step-up chopper means connected to said controlled rectifier means and said battery means for stepping up said first and second DC output voltages to produce a stepped-up voltage;
inverter means connected to receive said stepped-up voltage from said voltage step-up chopper means for converting said stepped-up voltage into a second AC voltage to produce an AC power output of said uninterruptible power supply;
AC interrupter means adapted to be connected between said source of said first AC voltage and an input of said controlled rectifier means for switching said first AC voltage and for producing a first start command when said AC input interrupter means is completely closed;
DC input interrupter means connected between an output of said controlled rectifier means and said battery means for switching said second DC output voltage; and
DC voltage detector means connected to detect said first DC output voltage from said controlled rectifier means for producing a second start command when said first DC output voltage reaches a DC reference voltage;
wherein said controlled rectifier means is connected to receive said first start command from said AC input interupter means for starting operation thereof on receipt of said first start command;
wherein said inverter means is connected to receive said first start command from said AC input interrupter means for starting operation thereof on receipt of said first start command; and
wherein said voltage step-up chopper means is connected to receive said second start command from said DC voltage detector means for starting operation thereof on receipt of said second start command.

2. An uninterruptible power supply according to claim 1, wherein:
said voltage step-up chopper means is connected to receive said AC power output for comparison with a reference value and for controlling said stepped-up voltage based on said comparison so as to maintain an AC voltage of said AC power output at a predetermined voltage.

3. An uninterruptible power supply according to claim 2, further comprising:
inverter transformer means connected to receive said second AC voltage from said inverter means for conversion into a transformed AC voltage; and
AC filter means connected to receive said transformed AC voltage from said inverter transformer means for shaping a sinusoidal waveform.

4. An uninterruptible power supply according to claim 3, wherein said inverter transformer means comprises:
means for transforming said second AC voltage such that said transformed AC voltage is smaller than said second AC voltage.

5. An uninterruptible power supply according to claim 4, wherein:
said controlled rectifier means includes rectifier control circuit means connected to receive said first start command from said AC input interrupter means for producing a first control signal on receipt of said first start command, and said controlled rectifier means starts operation thereof on receipt of said first control signal;
said inverter means includes inverter control circuit means connected to receive said first start command from said AC input interrupter means for producing a second control signal on receipt of said first start command, and said inverter means starts operation thereof on receipt of said second control signal; and said step-up voltage chopper means includes chopper control circuit means connected to receive said second start command from said DC voltage detector means for starting operation thereof on receipt of said second start command, and also connected to receive said AC power output for comparison with said reference value and for controlling said stepped-up voltage based on the comparison so as to maintain said AC voltage of said AC power output to said predetermined voltage.

6. An uninterruptible power supply according to claim 5, wherein:
said controlled rectifier means raises said first DC output voltage gradually on receipt of said first control signal; and
said voltage step-up chopper means raises said stepped-up voltage gradually on receipt of said second start command.

7. An uninterruptible power supply according to claim 6, wherein said inverter means comprises:
a fixed pulse width inverter.

8. An uninterruptible power supply according to claim 6, wherein said inverter means comprises:
a pulse width modulated inverter.

9. A method for starting an uninterruptible power supply including controlled rectifier means for converting a first AC voltage into a first DC output voltage, battery means for supplying a second DC output voltage, voltage step-up chopper means connected to receive said first DC output voltage and said second DC output voltage as a DC input voltage for stepping up said DC input voltage to produce a stepped-up voltage, and inverter means for converting said stepped-up voltage into a second AC voltage to produce an AC power output of said uninterruptible power supply, comprising the steps of:
starting said inverter means;
starting said controlled rectifier means so as to gradually raise said first DC output voltage;
detecting a reference time when said first DC output voltage reaches a DC reference voltage afer starting of said inverter means and starting of said controlled rectifier means;
said method further comprising after said detecting step the following steps:
starting said voltage step-up chopper means so as to raise said stepped-up voltage gradually after said reference time; and
connecting said battery means to an input of said voltage step-up chopper means after said reference time.

10. A method for starting an uninterruptible power supply according to claim 9, wherein:
said step of connecting said battery means is performed after an AC voltage of said AC power output reaches a predetermined voltage.

11. A method for starting an uninterruptible power supply according to claim 9, wherein:
said step of starting said voltage step-up chopper means is performed after the step of connecting.

12. A method for starting an uninterruptible power supply according to claim 9, wherein said uninterruptible power supply further includes an AC input interrupter means for switching said first AC voltage, further including the step of:
closing said AC input interrupter means; wherein said step of starting said inverter means and said step of starting said controlled rectifier means are performed after said AC input interrupter means is completely closed.

13. A method for starting an uninterruptible power supply according to claim 12, wherein:
said step of starting said inverter means and said step of starting said controlled recrifier means are performed simultaneously.

14. A method for starting an uninterruptible power supply according to claim 12, wherein:
said step of starting said controlled rectifier means is performed after said step of starting said inverter means.

* * * * *